(12) United States Patent
Gough (10) Patent No.: US 9,481,522 B2
(45) Date of Patent: Nov. 1, 2016

(54) CONVEYORS AND TRANSMISSION BELTS

(76) Inventor: George Terah Gough, Stoke on Trent (GB)

( * ) Notice: Subject to any disclaimer, the term of this patent is extended or adjusted under 35 U.S.C. 154(b) by 0 days.

(21) Appl. No.: 13/696,035

(22) PCT Filed: May 4, 2011

(86) PCT No.: PCT/GB2011/050872
§ 371 (c)(1),
(2), (4) Date: Nov. 2, 2012

(87) PCT Pub. No.: WO2011/138607
PCT Pub. Date: Nov. 10, 2011

(65) Prior Publication Data
US 2013/0048473 A1      Feb. 28, 2013

(30) Foreign Application Priority Data

May 4, 2010 (GB) .................................. 1007399.7

(51) Int. Cl.
*B65G 17/44* (2006.01)
*B65G 17/06* (2006.01)
*B65G 17/08* (2006.01)

(52) U.S. Cl.
CPC ............. *B65G 17/067* (2013.01); *B65G 17/08* (2013.01); *B65G 17/44* (2013.01)

(58) Field of Classification Search
CPC ....... B65G 15/52; B65G 17/38; B65G 17/42
USPC ........... 198/370.1, 371.2, 457.03, 750.2, 618
See application file for complete search history.

(56) References Cited

U.S. PATENT DOCUMENTS 3,976,192 A * 8/1976 Muller .................... B65G 15/52
                                                    198/803.2
4,281,760 A    8/1981 Muller
5,833,047 A * 11/1998 Howe ........................... 198/708
(Continued)

FOREIGN PATENT DOCUMENTS

EP        1477432         11/2004
EP        1477432 A1 *    11/2004
(Continued)

OTHER PUBLICATIONS

Dictionary.com, "Belt", online at http://dictionary.reference.com//browse/belt?s=t, Nov. 20, 2014, 8 pages.
(Continued)

*Primary Examiner* — Lester Rushin
(74) *Attorney, Agent, or Firm* — Wells St. John P.S.

(57) ABSTRACT

A belt for a conveyor comprises at least one elongate strip (1) and at least one slat (2) which forms a part of a conveyor surface upon which a load to be transported can be located. The slat is secured to the strip by a connector (7), optionally through a sliding dovetail joint, the connector comprising the tail part (5) of the joint and the underside of the slat being provided with a groove defining a socket part (3) of the sliding dovetail joint. The connector may pass through a hole (6) in the strip, or may embrace a relatively narrow section (523) of the strip. In an alternative, a belt for a conveyor comprises a plurality of interconnected slats which may support material to be transported and forming a conveyor surface, in which pairs of adjacent slats of the belt are connected together by means of co-operating slots and tabs.

16 Claims, 12 Drawing Sheets

(56) References Cited

U.S. PATENT DOCUMENTS

| | | | |
|---|---|---|---|
| 5,860,509 A * | 1/1999 | Baer | 198/809 |
| 6,321,904 B1 * | 11/2001 | Mitchell | 198/867.11 |
| 7,077,263 B1 * | 7/2006 | Richardson et al. | 198/844.2 |
| 7,243,780 B1 * | 7/2007 | Foster et al. | 198/750.2 |
| 7,360,640 B2 * | 4/2008 | Cash et al. | 198/699 |
| 7,597,189 B2 * | 10/2009 | Hinsley et al. | 198/690.2 |
| 8,430,236 B2 * | 4/2013 | Krischer | 198/853 |
| 8,689,969 B2 | 4/2014 | Gough | |
| 2004/0144627 A1 | 7/2004 | Trebbi et al. | |
| 2009/0133993 A1 | 5/2009 | Ishikawa | |
| 2011/0048901 A1 | 3/2011 | Gough | |
| 2012/0024030 A1 * | 2/2012 | Chen et al. | 72/127 |

FOREIGN PATENT DOCUMENTS

| | | |
|---|---|---|
| EP | 1477432 B1 * | 6/2005 |
| GB | 15569 | 0/1912 |
| GB | 2004518 | 4/1979 |
| GB | 1007399.7 | 11/2010 |
| JP | 2003321114 | 11/2003 |
| WO | WO 02/100745 | 12/2002 |
| WO | PCT/GB2011/050872 | 8/2011 |

OTHER PUBLICATIONS

Baylor, "Sliding Dovetail Joints", available online at http://woodworking.about.com/od/joinery/p/SlidingDovetail.htm, Mar. 1, 2009, 1 page.

Hylton, "Sliding Dovetail Joints", available online at http://www.woodworkersjournal.com/sliding-dovetail-joints, Oct. 27, 2014, 3 pages.

JP 2004-155529 Abst/Full Ref, Jun. 3, 2004, Nishioka Sekkei Jimusho KK.

JP 2004-155529 Translation, Jun. 3, 2004, Nishioka Sekkei Jimusho KK.

JP 2013-508552 OA with Trans, Feb. 16, 2015, George Terah Gough.

JP H 05-066086 Abst/Full Ref, Mar. 19, 1993, Taihei Mach Works Ltd.

JP H 05-066086 Translation, Mar. 19, 1993, Taihei Mach Works Ltd.

JP S 27-002822 Full Reference, Jul. 29, 1927, JP (applicant unknown).

JP S 52-137486U Full Reference, Oct. 19, 1977, JP (applicant unknown).

WO 2009/030913 Full Reference, Mar. 12, 2009, George Terah Gough.

* cited by examiner

CONVEYORS AND TRANSMISSION BELTS

CROSS REFERENCE TO RELATED APPLICATION

This application is a 35 U.S.C. §371 of and claims priority to PCT International Application Number PCT/GB2011/050872 (Publication No. WO 2011/138607 A2), which was filed 4 May 2011, and was published in English, and this application claims priority to GB Patent Application No. 1007399.7 which was filed 4 May 2010 and the teachings of which are incorporated herein by reference.

This invention relates to slat type conveyor belts and conveyors as such.

Conveyors are well known in the prior art. One known type of conveyor is the slat conveyor. In a typical slat conveyor assembly a frame is provided onto which a flexible conveyor belt comprising a plurality of slats can be movably attached. The conveyor comprises a frame which has a pair of elongate spaced apart side rails. At each end of the frame are two or more pulleys which are supported by a drive axle held at each end in bearings in the side rails. At least one of the drive axles is powered so that the pulley will rotate. An endless conveyor belt comprising a set of slats fixed relative to one another in a row is located between the side rails, and the drive wheel engages with the underside of the belt, dragging the belt around the powered pulley.

Many types of steel or plastic belt are known in the art, and generally it is desirable to provide a belt which is simple to construct and uses relatively few independent parts to reduce assembly time and maintenance.

According to a first aspect the invention provides a belt for a conveyor comprising at least one, but preferably a plurality of elongate strips, and at least one slat which forms a part of a conveyor surface upon which a load to be transported can be located, in which the slat is secured to the strip by a connector which comprises a first connector part that is secured to the slat and a second connector part that is secured to the slat or the first connector part, the strip passing between the first connector part and second connector part.

The first connector part may be secured to the slat through a releasable connection, such as a dovetail joint. It may be formed integrally to the slat, perhaps by molding the slat and at least part of the connector as a single component.

The slat may comprise two or more individual slat sections that are connected together end on end to form a composite slat. One or more intermediate pieces may be provided between the ends to form the connection. Most conveniently, each slat section is substantially identical to the other, making it simple to produce composite slats in a variety of length from a small set of identical slat sections.

The connector may comprise a first part fixed to the slat and a second part which connects to the slat or the first part to embrace a section of the strip where the first part and second part may connect by a snap fit connection. This allows the two parts to be fixed together without the need for any additional fixings such as nuts or screws, and can allow it to be assembled without the use of tools.

According to a second aspect the invention provides a belt for a conveyor comprising at least one, but preferably a plurality of elongate strips, and at least one slat which forms a part of a conveyor surface upon which a load to be transported can be located, in which the slat is secured to the strip by a connector through a sliding dovetail joint, the connector comprising the tail part of the joint and the underside of the slat being provided with a groove defining a socket part of the sliding dovetail joint.

The socket may extend across the underside of the slat in a direction that is not parallel to the long axis of the belt and may be open ended at least at one side of the slat to enable the tail to be slid into the slat from that open end during assembly. In use the tail may be free to move along the socket to allow some side to side movement of the belt and slats as the conveyor is operated.

The conveyor may include two spaced side walls between which the slats are located, the walls limiting the amount of side to side movement of the slat relative to the belt.

In practice the conveyor belt will comprise many slats, connected to the at least one strip at spaced intervals so that the leading edge of one slat abuts or overlaps the trailing edge of the adjacent slat to form a substantially continuous support surface.

Each slat may be identical to the other slats, and they may all be connected to the belt by similar or identical dovetail joints.

The connector may comprise a body which is located on the opposite side of the belt to the slat such that the belt is located between the body and the underside of the slat.

The body may comprises a trunion or guide surface, and may typically be semi-cylindrical with the flat surface of the body engaging the underside of the drive belt and the curved surface forming a sliding support for the belt.

In addition to, or as an alternative to, the provision of trunions the strips of the belt may include regularly spaced guide slots, and the conveyor may include a driven pulley shaped to engage the slots, typically by means of protruding teeth or guide pins.

The conveyor may include at least one driven pulley which includes indentations spaced around its circumference into which the trunions can engage, thus allowing the belt to be pulled along by the driven pulley. The profile of the indentations may complement that of the trunions.

The trunions are therefore preferably spaced at equal distances apart along the belt, the spacing matching the spacing between the indentations of the driven pulley.

The or each strip may include a hole along its center line and the connector my may extend through the slot such that the tail of the connector is on one side of the strip and the body, typically a trunion, is on the other. In practice where there are many slots there will be many holes located at spaced intervals along the center line of the strip.

The hole may have a first part which is wide enough to allow the tail of the connector to be passed through the hole in the strip during assembly before being moved along the strip to engage a second part of the slot which is narrower than the first and through which the tail part cannot be withdrawn.

The connector may be fixed in position in the narrow second part of the slot by one or more tabs on the strip. These tabs may be located alongside the hole which extend out of the plane of the belt to engage the connector. They may be located on the edges of the hole, or on the edges of the strap alongside the hole. These tabs may be deformable so that during assembly they can be aligned with the plane of the strip allowing the connector to move from the first to second parts of the hole before the tabs are bent out of the plane of the strip to prevent the connector moving to the first part of the hole. They can be bent upwards to engage a part of the tail of the connector, or downward to engage a part of the base of the connector.

The connector may comprise a unitary component, with the body and tail formed of a piece. It may interlock the strip and the slat without the use of any fasteners such as nuts or bolts or pins or the like.

In an alternative, the connector may be secured to the strip by one or more fasteners, such as pins, screws, bolts, rivets or other suitable fasteners. The body of the connector and the tail may in that case be separate components.

In a still further alternative, the connector may comprise two releasable parts which when connected together in a position of use embrace a section of the strip such that the tail of the connector is on one side of the strip and the body, typically a trunion, is on the other side of the strip.

The strip may include a narrow waist section, and the connector may embrace this narrow waist section by locating the section in an opening which is at least as wide as the narrow section but not as wide as the un-narrowed part of the strip. This prevents significant movement of the connector along the strip.

The connector may comprise a first body portion including the tail which is located on one side of the strip and a second body portion that is located on the other side of the strip, one of the body portions including side portions that project from one side of the strip to the other and the other body portion being connected to the side portions to embrace the strip. The second body portion may be a snap fit to side portions on the first body portion.

Where provided the side portions may include projections which engage with recesses in the other body portion through a snap fit.

The conveyor may include two sets of strips arranged in parallel locations, each one being secured to the slat (or many slats) at spaced locations on the slat through a connector as described hereinbefore. Each of the two sets of strips may comprise at least one, and preferably a plurality, of strips.

Each strip may be substantially inextensible and yet elastically flexible planar strip, forming an endless belt. The strip(s) may be of steel and preferably spring steel. Where a plurality of strips are provided they may be keyed at regular intervals to fasten them together. All the strips may be of a consistent length.

One or more infill pieces may be provided with are located in the parts of the elongate socket on the slat that are not occupied by a tail of a connector. They may be shaped to completely fill the socket to prevent material entering the socket and becoming trapped and may have a face which sits flush with the underside of the slat. This makes the belt easier to clean.

The slats (or at least some of the slats) may comprise plastic material. They may have a flat upper surface and underside so that in use the underside rests on the top of the endless belt at least when a load is placed on its surface.

The connector member may be used to secure the ends of adjoining strips together by overlapping the end of one belt with the end of another so that slots in the belts overlap and locating the connector so that it extends through both slots.

According to a second aspect the invention provides a belt for a conveyor comprising: a plurality of interconnected slats which may support material to be transported and forming a conveyor surface, in which pairs of adjacent slats of the belt are connected together by means of co-operating slots and tabs.

The conveyor belt may include a joining member, the joining member having an upper surface and a lower surface and comprising a slot passing through the joining element from the upper surface to the lower surface, and the interconnected edges of each pair of adjacent slats including respective tabs which projects downwards through the slot to link the slats to the joining member.

Thus the slot and tab connection may connect the slats indirectly through the joining members. The belt will comprise a series of slats connected by joining member. Two tabs, one from each adjacent slat, may be located in each slot of the joining member.

Each of the tabs may include a further secondary tab which projects upwards from a point near the free end of the respective tab on the lower side of the joining member, the secondary tab forming a hook that prevents the tab pulling out of the slot in the connector.

The secondary tabs may be flexible so that the tab can be pushed through the slot in the joining element but cannot then be withdrawn under a normal pulling force.

Each joining member may comprise an inverted v-shaped elongate bar or rod or plate or such like with the slot being formed in the apex of the member so that the tabs sit within the wings of the member and allow the slats to move relative to the member. This arrangement enables the slats to move around the pulleys of the conveyor. It can conveniently be formed as plate folded along a center line to form two wings.

The internal angle between the walls may be at least 60 degrees and perhaps up to 120 degrees. The tabs on the edges of the slats may extend in a plane that lies at an angle of between 30 and 50 degrees of the plane of the slat surface. The skilled person will appreciate that the choice of angle determines how tight a radius the belt may be bent through as it is wrapped around a drive pulley of the conveyor. This will also depend on the length of each slat (measured along the direction of movement of the belt in use).

A trunion or roller may be located on the underside of the joining member at any desired position across its width. The trunion may support the loaded slats above a support track of the conveyor. It may be connected to the joining member by a plate which engages in slots in the joining members through an interference fit.

The conveyor may include at least one driven pulley which includes indents within which the trunions may be received, enabling the pulley to pull the belt along as it turns.

The slats may be provided with downwardly extending side walls on their edges if required.

In an alternative one of each pair of slats may comprise a tab and the other a slot, with the tab engaging the slot. In this arrangement the tab and slot connection may directly connect the slats of a pair.

Each slat may comprise two or more tabs which engage in respective slots. In some arrangements, each slat may comprise at least one tab and at least one slot, the tabs on one slat of a pair engaging corresponding slots on the other slat of each pair.

Each slot may be provided with at least one cap which covers an edge of the slot to form a bearing surface for the tabs to reduce wear of the slot. The cap also provides a cover for the edges of the slot which may be quite rough and can therefore provide a smoother movement of tab relative to the slot as the slats move around the end pulleys of the conveyor. Caps may be provided on the leading or trailing edges, or both leading and trailing edges of the slot.

The at least one cap may comprise a clip which clips over the edge of the slot. The clip may be C-shaped, and may have a smooth outer face which forms the wear surface.

The clip may comprise a C-shaped spring clip in which the arms of the c-shaped spring clip are resiliently deformed when fitted to the edge of the slot so as to secure the clip in position.

It will also be appreciated that any of the features of the first aspect of the invention may be combined with the features disclosed hereinbefore of the second aspect of the invention.

According to a third aspect the invention comprises a conveyor including at least one belt according to the first or second aspects of the invention.

There will now be described, by way of example only, three embodiments of the present invention with reference to the accompanying drawings of which:

FIG. 1(a) is perspective view of a part of a first embodiment of a conveyor belt showing four of a plurality of slats connected to two elongate endless strips, 1(b) shown one slat of the belt in cross section and 1(c) shows a section of one of the strips in plan view;

FIG. 5(a) is an exploded view of a conveyor belt of a second embodiment of the present invention and 5(b) is a view in cross section of one slat and the connector that joins it to a strip of the belt;

FIG. 17(a) is a view of a part of the connector of the embodiment of FIG. 15 and (b) is a view of another part of the connector.

Figure 1:
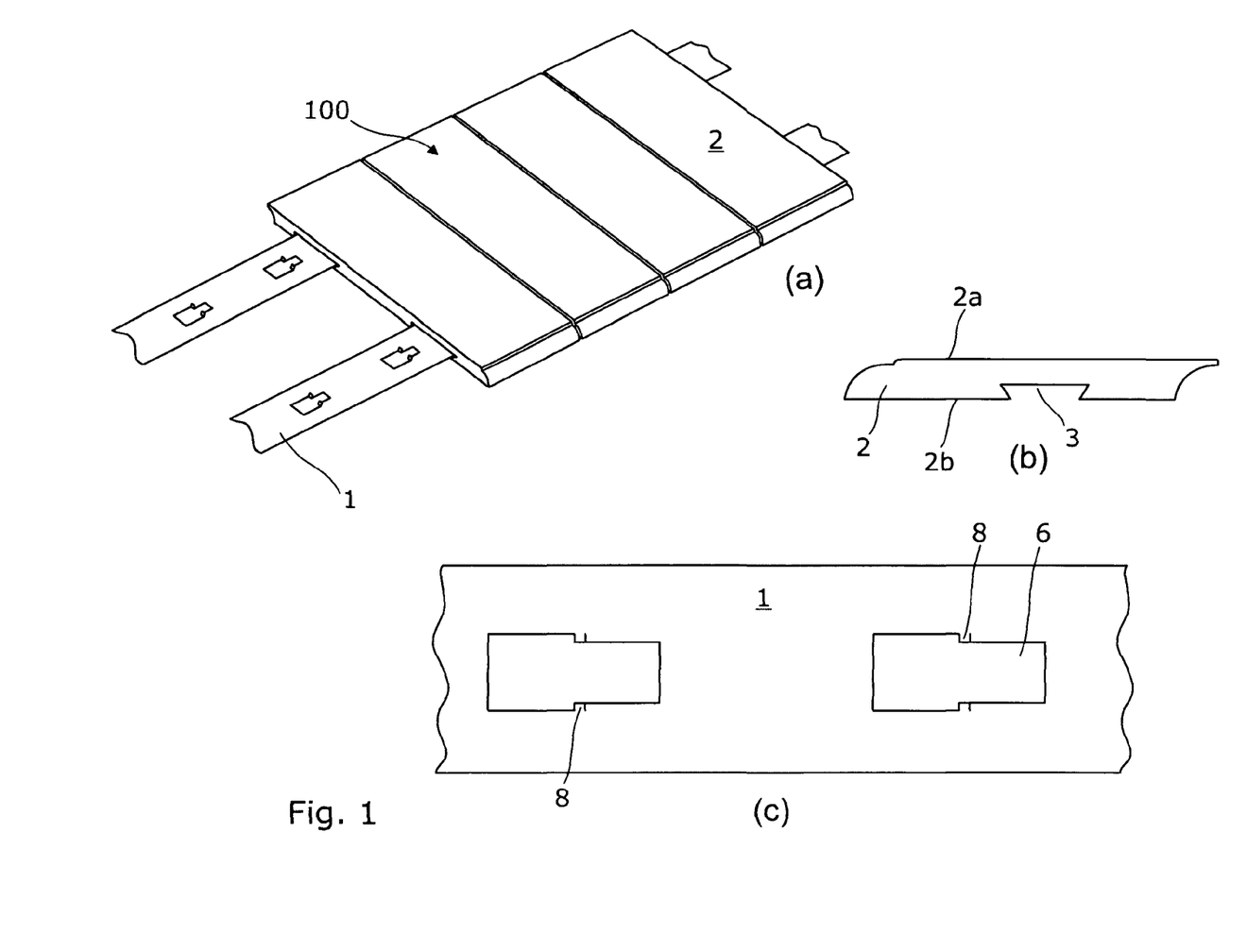
Figures 2, 3:
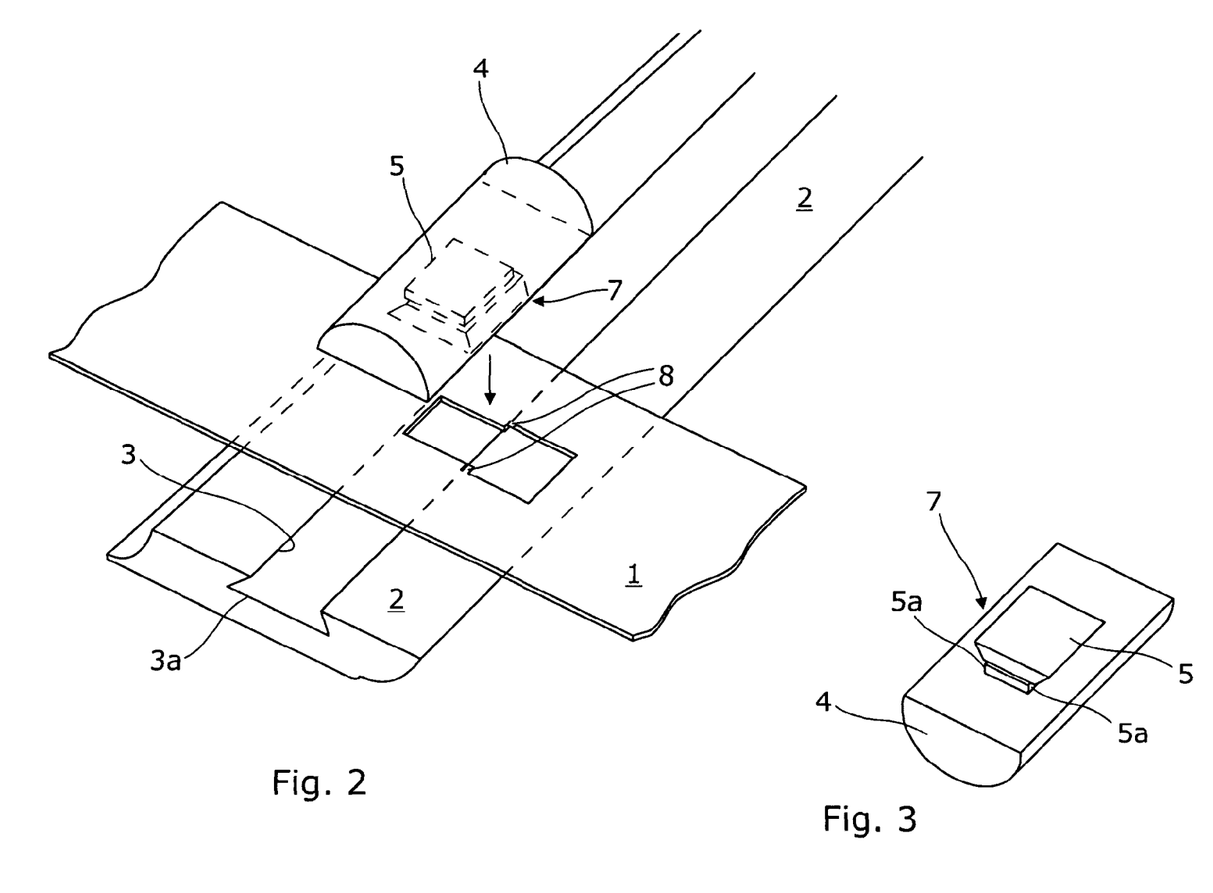
FIG. 2 is in an exploded perspective view from the underside of a section of the conveyor belt of FIG. 1 showing in detail a connector that joins a slat to a strip of the belt.
FIG. 3 is a perspective view of the connector from above.

FIG. 1 (a through c) and FIGS. 2 and 3 shows a first embodiment of a conveyor belt for a conveyor in accordance with the first aspect of the invention. As shown in FIG. 1 (a) an endless conveyor belt 100 generally comprises two elongate endless metal strips 1 with holes 6 at spaced locations along their centre lines. Each hole 6 receives a connector 7 which is shown in FIG. 2 and FIG. 3. The connector 7 secures a slat 2 to the strip 1. Many slats 2 are provided in a series to form a continuous upper support surface of the conveyor belt 100.

Each slat 2 comprises a elongate member, shown in FIG. 1(a) as being generally rectangular although other shapes could be provided, with an upper side 2a and an underside 2b separated by a thickness. The slats 2 extend transversely across the two elongate strips with the underside 2b of the slats 2 resting on the top surface of the strips 1. On the underside 2b of the slat 2 is a socket 3 which extends approximately along the center line of the slat 2 from one side to the other so that it is open at both ends. One end 3a can be seen in FIG. 2.

Figure 4:
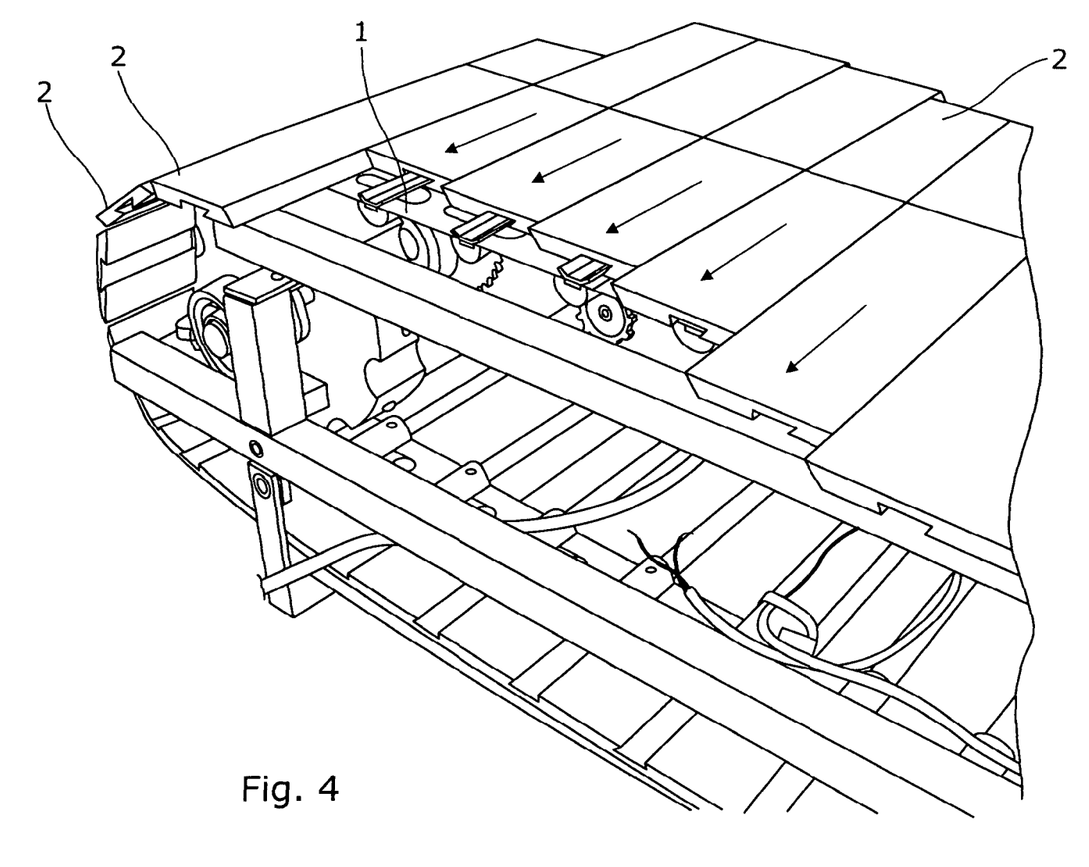
FIG. 4 is a photograph showing the belt during assembly as viewed from the above.

The socket 3 in each slat is a slat 2 has a trapezoidal cross section with the space between the side walls of the socket where they meet the base of the socket 3 being wider than the gap between the openings of the socket so that the walls effectively taper away from each other to form an undercut. The slat 2 is positioned relative to the strips 1 so that the socket 3 is located above a respective hole 6 in each of the two strips. This can be seen in FIG. 2 of the drawings and also in the photograph in FIG. 4.

A connector 7 is provided which comprises a lower body 4 forming a trunion of semi-cylindrical cross section and a tail 5 which projects from the center of the flat side of the body 4. The tail 5 is trapezoidal and wider at its end furthest from the body 4 than it is at its end nearest the body, and complements the cross section of the socket. As such the tail tapers outwards away from the body. A groove is cut into two opposing sides of the connector at the base of the tail.

FIG. 2 is an exploded view of the strips, slats and connector. In a position of use, the connector 7 extends though the hole 6 in the strip so that the body 4 is located on the underside of the strip 1 and the tail 5 is located in the socket of the slat to form a dovetail joint between the connector 7 and the slat 2. The body is sized so that it cannot pass through the hole 6 and so the strip 1 is sandwiched between the body and the slat 2. In this position the slat and connector cannot be pulled apart unless the slat is slid to the side so that the tail leaves the socket.

Figures 13, 14:
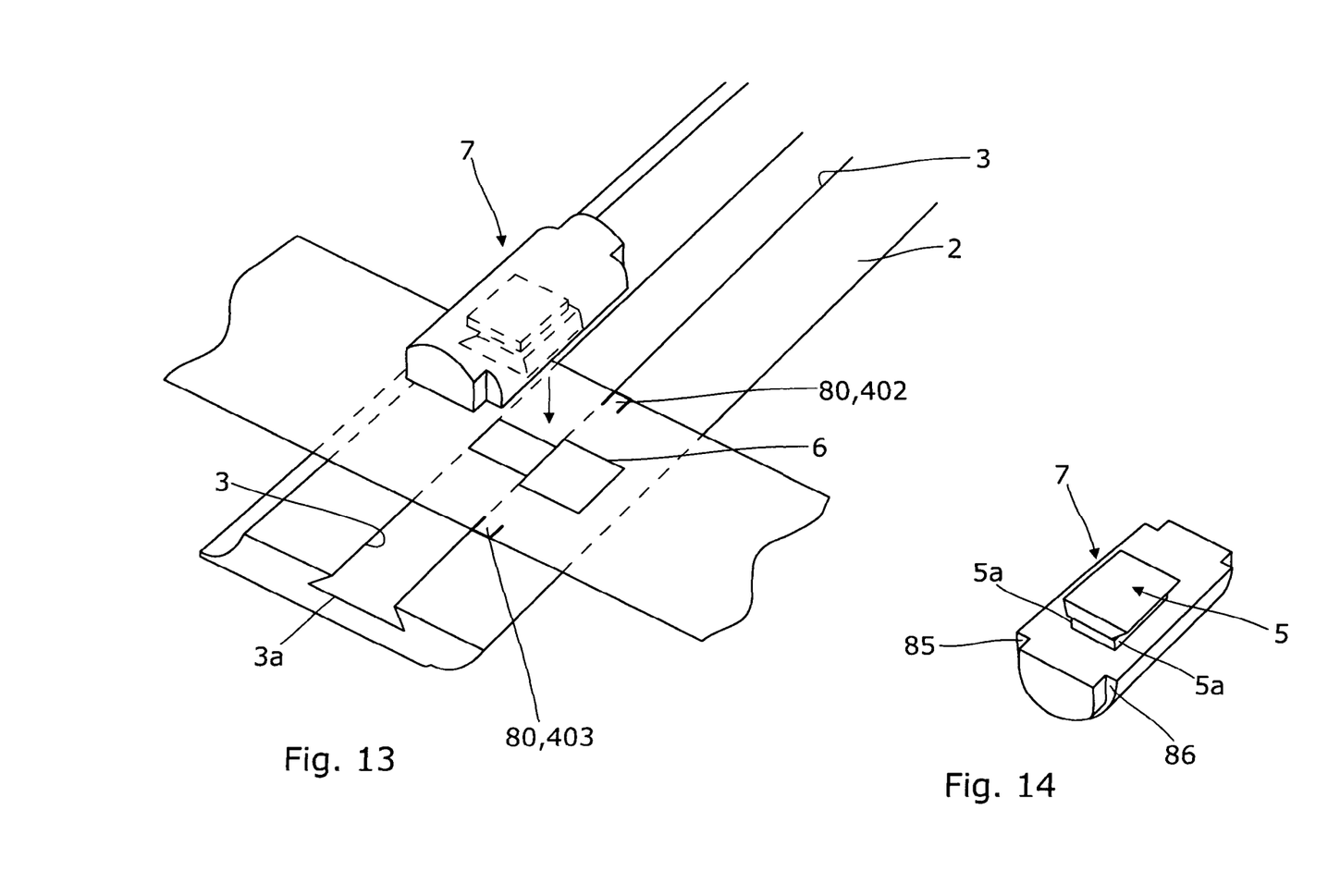
FIG. 13 is a view of an alternative arrangement of connector and strap which is otherwise the same as that of FIG. 2.
FIG. 14 is an alternative view of the connector of FIG. 13.

The belt is located between the walls of a conveyor frame of the kind shown in FIG. 14. The walls prevent the slats moving side to side by a distance great enough for the tail 5 to leave the socket 3. Thus, the slats are connected to the belt through the dovetail joint formed by the tail and socket without the need for any fasteners.

In order to enable the tail 5 of the connector 7 to pass through the hole 6 the hole 6 may comprise first and second portions 6a, 6b, with the first portion 6a being enlarged for the tail 5 to pass through and the second portion 6b being narrower than the first portion to prevent the tail being withdrawn back through the hole. As shown, the width of the second part in a direction transverse to the center line of the strip is only slightly larger than the spacing between the slots 5a at the base of the tail so that the connector is a snug fit into the second part of the hole.

A pair of deformable tabs 8 are provided on the edges of the hole 6 where it steps from the first portion 6a to the second portion 6b. In use these can be bent out of the plane of the strip to engage the connector and hold the connector securely in place in the second portion of the hole prior to sliding the socket on the slat onto the tail of the connector.

An alternative design is illustrated in FIGS. 13 and 14. Instead of a pair of deformable tabs which extend from the sides of the hole 6, a pair of tabs 80 are provided on opposite edges of the strip 1 spaced apart from the hole 6. Two recesses 85,86 are cut into the corners of the flat face of the base of the connector 7, and the tabs 80 may be bent out of the plane of the strap 1 to sit within these recesses 85,86 and hold the connector 7 in place in the second portion of the hole 6. Therefore these tabs bend in the opposite direction to those shown in FIG. 2 of the drawings.

The conveyor includes a drive wheel or pulley which is provided with indents around its circumference which are spaced according to the spacing between the bodies of the connectors. In use the bodies may locate in the indents allowing the pulley to drag the conveyor along. In addition, guide pins may be provided on the wheel which can locate within the first portions of the holes 6 to align the belt or to pull the belt along.

By providing the metal strips 1 and connectors 7 it is possible to make a conveyor belt 100 which uses low strength slats, perhaps of plastic material, and yet which carry heavy loads as the force needed to drag the belt along is transmitted axially through the metal strips 1. Also, no fastenings need to be provided to hold the conveyor belt together, reducing the risk failure and allowing simple assembly and disassembly. It also reduces the number of regions at which dirt can accumulate and makes cleaning simpler.

Figures 5A, 5B:
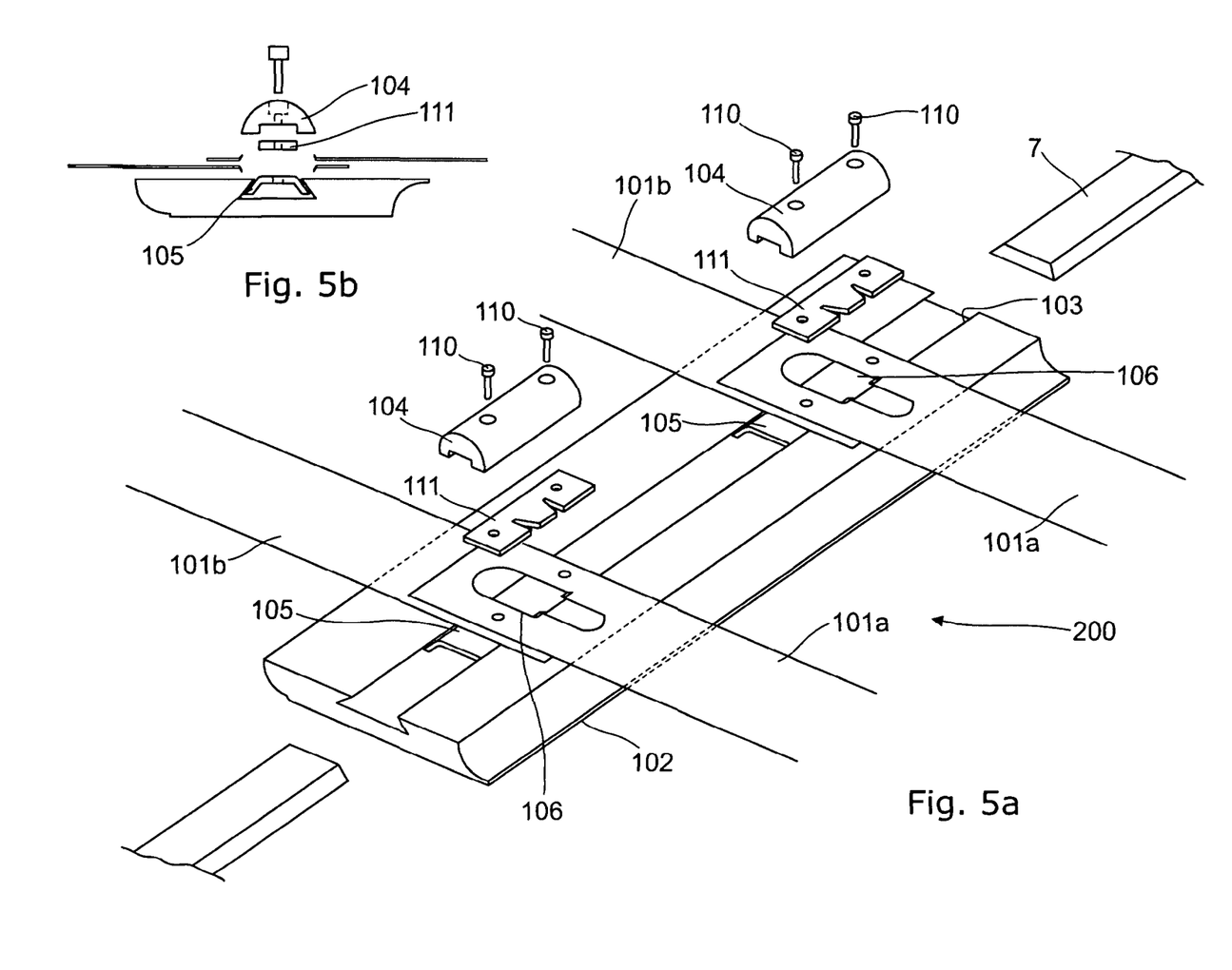
Figure 6:
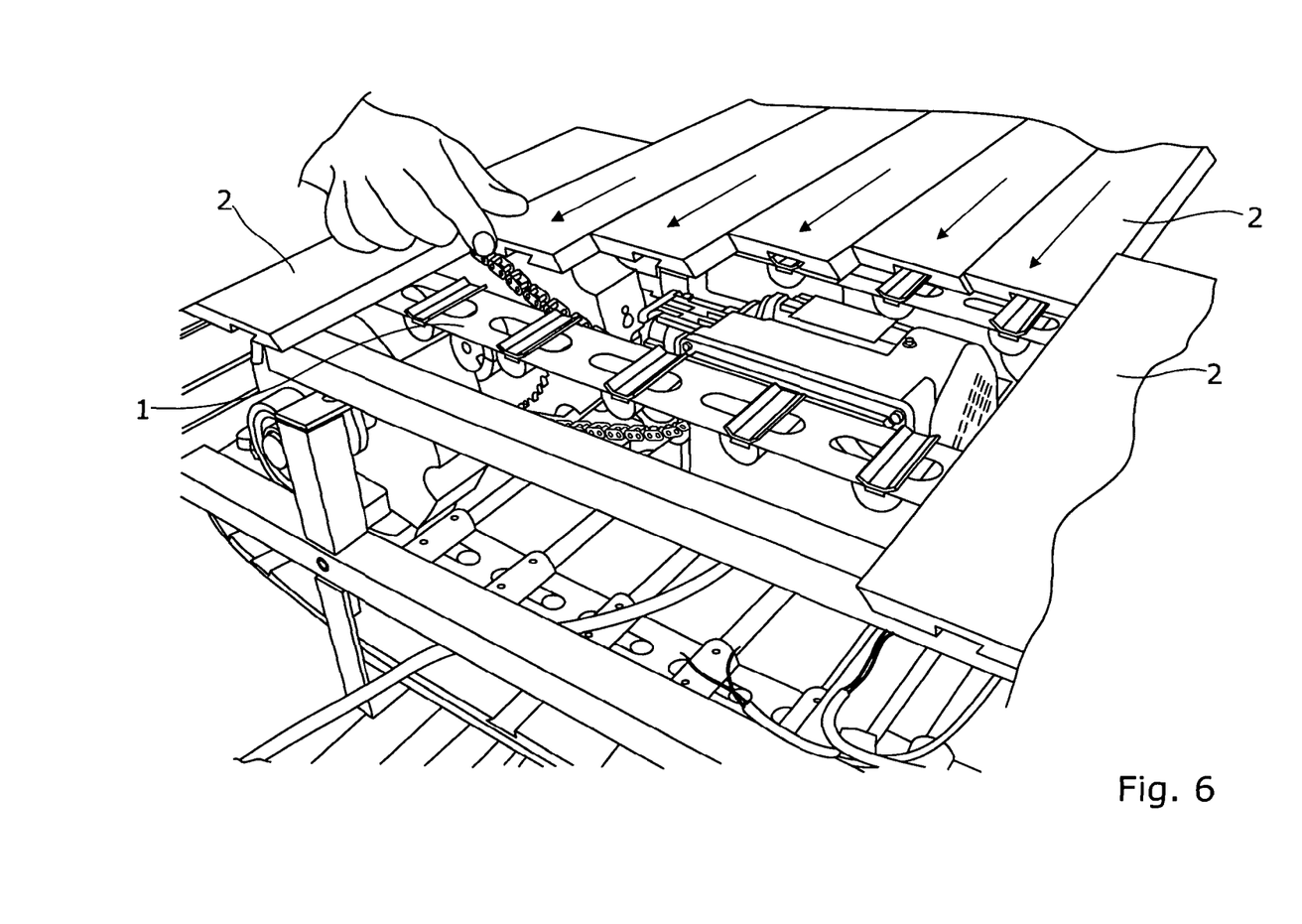
FIG. 6 is a photograph similar to that of FIG. 4 of the belt of the second embodiment of FIGS. 5(a) and (b)

A second embodiment of a conveyor belt 200 for a conveyor is illustrated in FIGS. 5a in exploded form and FIG. 6 during assembly. FIG. 5b shows a part of the belt in cross section.

As with the first embodiment two elongate endless metal strips 101 are provided. As shown the strips comprise two separate metal bands 101a and 101b which overlap to form endless strips. Each strip 101a and 101b includes spaced holes 106 along their center lines. The strips 101a and 101b are overlapped so that at least one hole 6 in each strip is aligned with a corresponding hole 6 in the other. The more overlap provided the stronger the connection of the two straps.

Attached to the strips are connectors. Only the two connectors that are associated with the holes 6 at the overlap are shown in FIG. 5a, but the others may be the same. Alternatively the other connectors may be provided in accordance with the first embodiment of a conveyor belt 100.

Each connector comprises a separate body 104 part and a tail part 105. The body 104 has a semi-cylindrical cross section defining a trunion and is located on the underside of the overlapped strips 101a and 101b. It is fixed to the tail part which is located on top of the overlapping region of the strips 101a and 101b. The body 104 includes two through holes 109a, 109b which accommodate bolts 110 which engage threaded bores in the tail part 105. These bolts also pass through holes in the strips located on either side of the overlapped holes 106 so that tail part cannot move relative to the band.

The slats 102 in this second embodiment have the same features as the slats of the first embodiment, each including an elongate socket 103 of trapezoidal cross section on an underside into which the tail 105 is received to form a dovetail joint.

Also shown in this embodiment is a metal plate that is located between the body 104 and the strips 101a, 101b. This provides additional reinforcement of the connector and enables the body to be made of a relatively soft material such as nylon. The plate includes a tongue which slides into the hole 6 and helps to locate the body in place during assembly.

In both the first and second embodiments infill pieces may be provided which fill the parts of the sockets 3 on the underside of the slats 2 that are not filled by the tails of the connectors. Where two spaced strips are used, and hence two connectors for each slat 2, there may be three infill strips for each slat. One infill may be located between the connectors in the socket, and the other two provided on either side of the connectors.

Figure 7A:
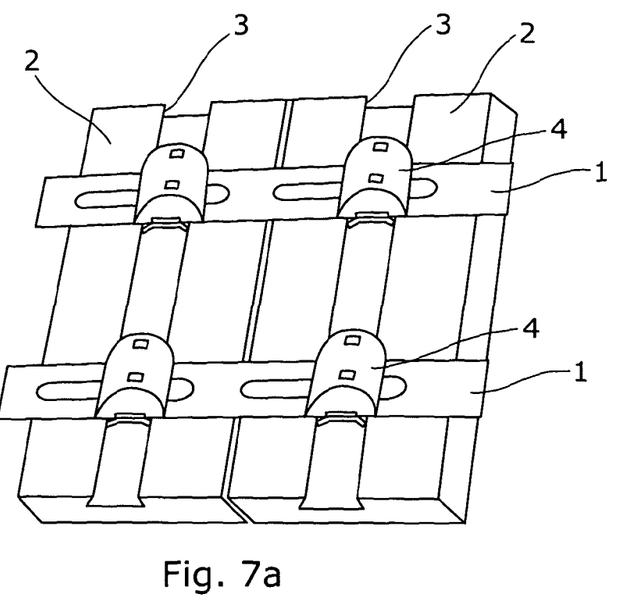
FIG. 7(a) shows an underside of a small section of the belt of FIGS. 5(a) and 5(b) without infill pieces.
Figure 7B:
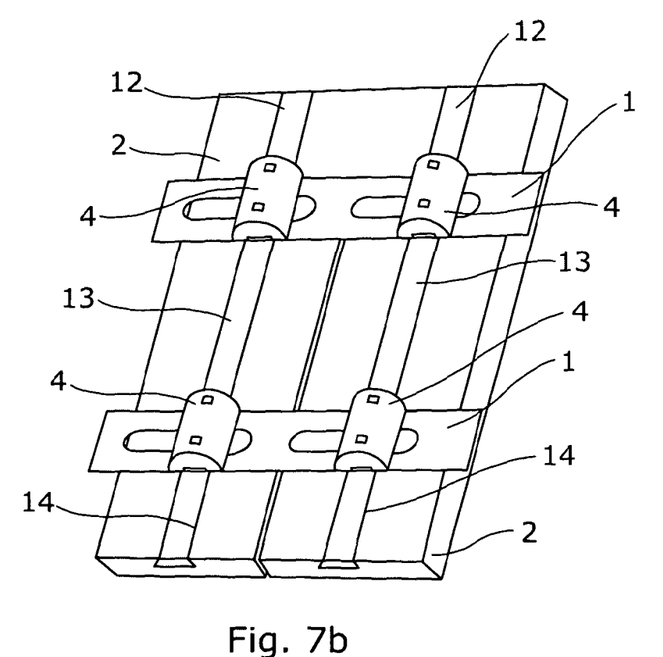
FIG. 7(b) is a similar view of FIG. 7(a) buts shows the location of infill pieces in the socket on the underside of the slat.

FIG. 7a shows the underside of a slat 2 without infill pieces and FIG. 7b shows the underside with the infill pieces 12 in place. Each infill piece 12 has a trapezoidal cross section that complements that of the sockets to fill them snugly and sit flush with the underside of the slat. The infill pieces 12 prevent food or other material entering the sockets and becoming entrapped making it easier to keep the conveyor belt clean.

Figure 8A:
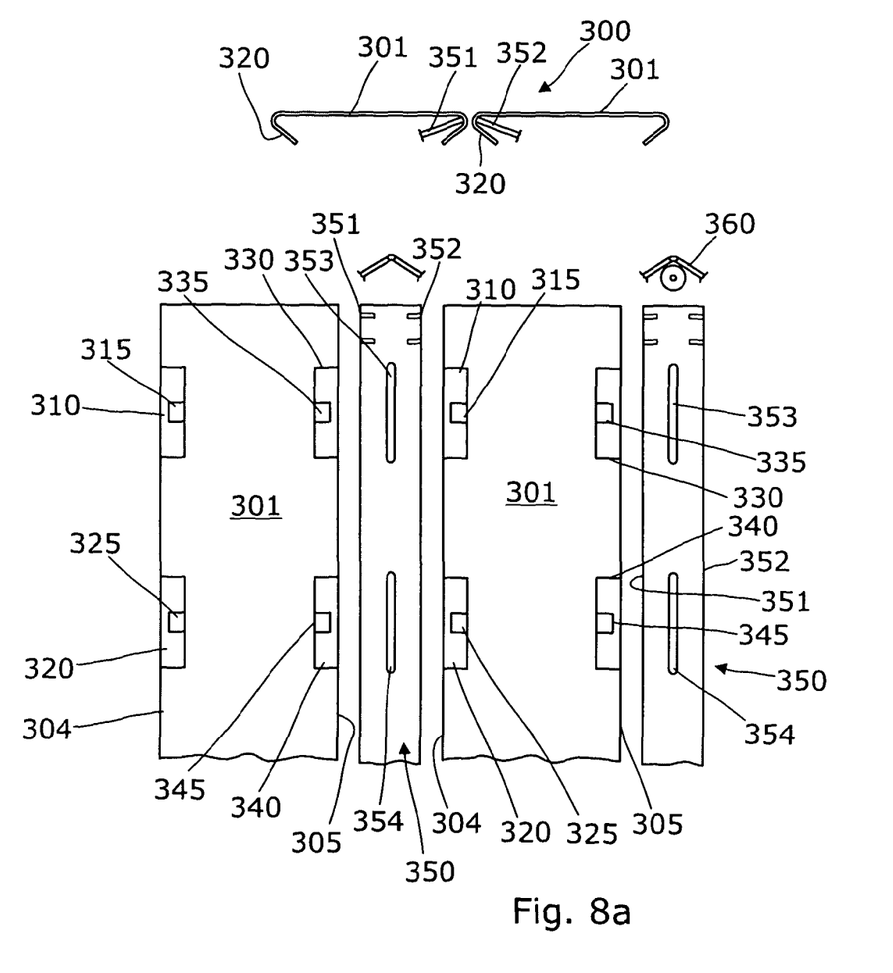
FIG. 8(a) is an exploded view in plan and 8(b) a view in cross section of a third embodiment of a conveyor belt.
Figure 8B:
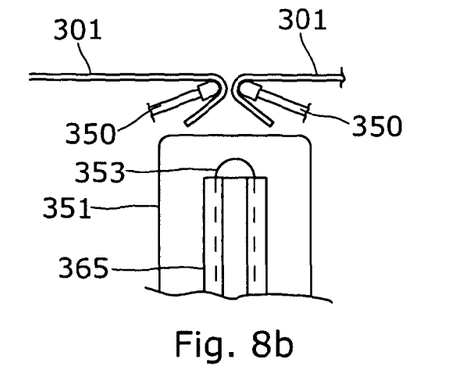
Figures 9, 10, 11, 12:
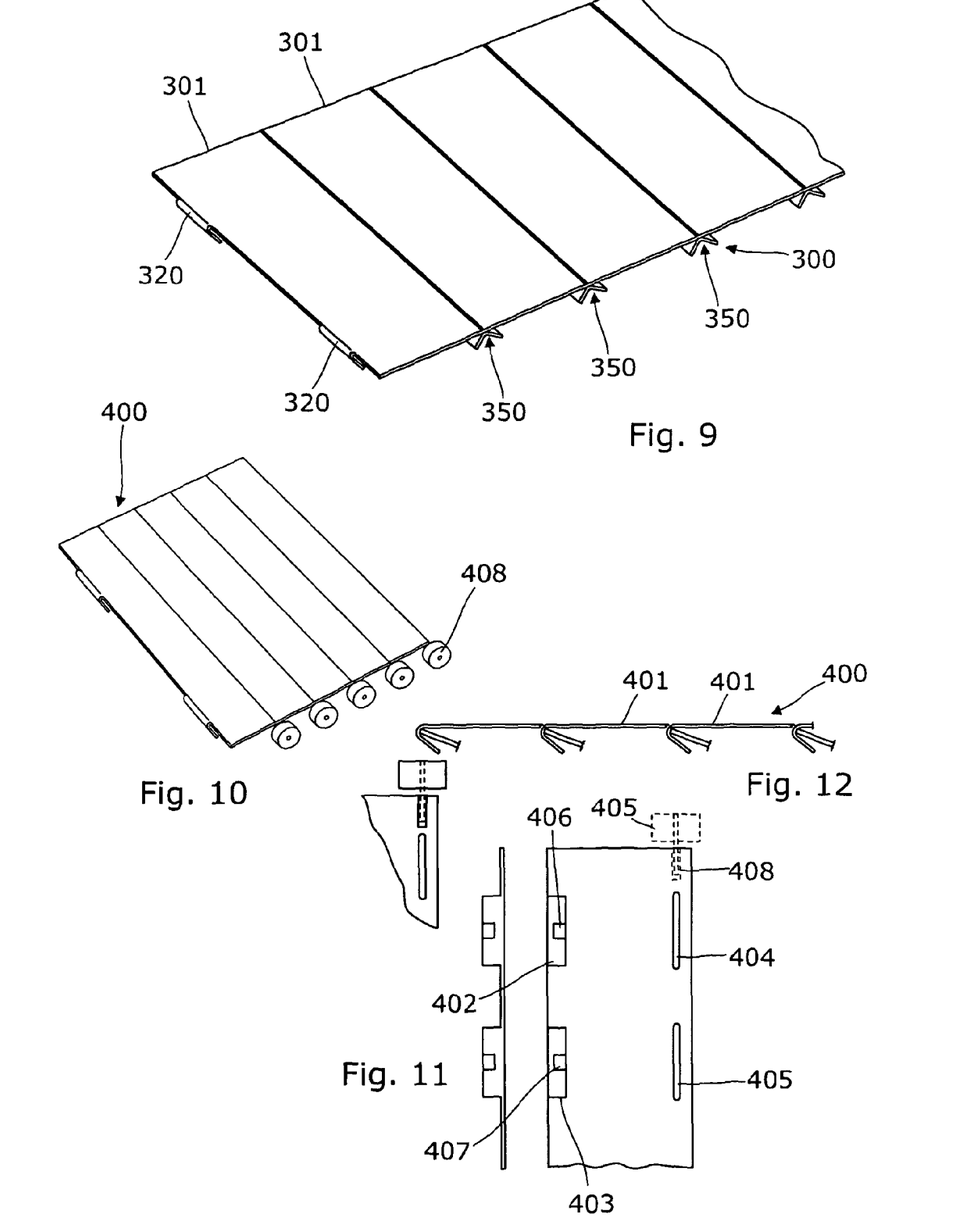
FIG. 9 is a perspective view of a section of the conveyor belt of FIGS. 8(a) and 8(b) when assembled.
FIG. 10 is a perspective view of a section of a fourth embodiment of a conveyor belt.
FIG. 11 is an exploded plan view of a section of the belt of FIG. 10.
FIG. 12 is a view in cross section of the section of belt shown in FIG. 10.

A third embodiment of a conveyor belt 300 which falls within the scope of the third aspect of the invention is shown in FIGS. 8 and 9 of the accompanying drawings. In this embodiment there is no requirement for any endless strips 1, 101 to which the slats are connected, the slats instead being connected together in series using a tab and slot connection.

Each slat 301 is identical in this embodiment, and comprises a metal (or other material) slat with an upper surface 302 and an underside 303. Each slat 301 comprises a planar body which has a leading edge 304 and a trailing edge 305, and on each leading edge two tabs 310,320 are provided. These are bent downwards out of the plane of the body so that an internal angle between the tab and the underside of the body is formed of around 45 degrees. At the free end of each tab 310, 320 is a secondary tab 315, 325 which extends upwards part way towards the root of the tab where it connects to the body portion. These secondary tabs are bent out of the plane of the tab so that an internal angle or around 10 degrees is formed.

The trailing and leading edges of the slats 301 in the example are identical, so the trailing edges also include two tabs 330,340 which each have secondary tabs 335,345 but they could have differing numbers of tabs or tabs in different positions.

The conveyor belt also includes a plurality of joining elements 350 or bars. Each joining bar 350 comprises an elongate metal strip that has a length equal to, or slightly less than, the slats 301. The strip is folded slightly along its center line to form two wings 351,352 which meet at the fold to define an internal angle of around 120 degrees. This angle can vary from conveyor to conveyor.

Located at spaced positions along the fold line are two slots 353,354 which are aligned with the location of the tabs 310,330 and 320,340 respectively on the slats. The slats 301 and joining bars 350 are arranged so that the tabs on the trailing edges of a slat pass through the respective slots together with the tabs on the leading edges of the adjacent slot so that the tabs lie in the space defined between the wings of the joining bar. Thus each slot receives one tab from a leading edge and one from a trailing edge—two tabs in each slot. The secondary tabs are located on the opposite side of the joining bar 350 to the body of the slats 301 and are bent out to an angle of about 30 degrees thereby prevent the tabs being pulled out of the slots.

In a modification the trailing edges of the slots 353, 354, or both trailing and leading edges, may be covered by a reinforcing member 355 as shown in FIG. 8(b). The reinforcing member comprises a C shaped cap which clips onto one edge to provide. The cap provides a smoother surface on which the tabs pivot when the conveyor is pulled around the end pulleys, compared with the tabs acting directly on the edges of the slots. They can also be of harder material than the joining member which will reduce the wear of the conveyor, especially when under high loads or in difficult operating conditions.

Optional trunions or roller 360 may be provided which are secured to the joining bars. These may be located at any desired position across the bars to engage with a drive wheel or pulley of the conveyor and to support the slats reducing friction between the guide tracks of the conveyor and the moving belt. They may be made of a low friction material such as nylon and secured to the slats by plates which are located within guide slots in the slats.

In a fourth embodiment shown in FIGS. 10 and 11, which falls within the scope of the second aspect of the invention, a conveyor belt 400 is provided which comprises slats 401 that are directly connected to adjacent slats 402 by a tab and slot connection. They are not connected indirectly through a joining bar. This type of belt is more suited to lighter duty applications than that of the third embodiment.

As shown in exploded view in plan and cross section in FIG. 11, each slat comprises a plate of metal or the like which has two tabs 402,403 on a leading edge and two slots 404,405 on a trailing edge. As with the third embodiment secondary tabs 406,407 are provided on the free ends of the tabs 402,403 The tabs are bent out of the plane of the plate so that an angle of less than 90 degrees, and preferably around 45 degrees, is formed between the underside of the slat and the tab.

When assembled, shown in cross section in FIG. 12, the tabs on one slat 401 engage the slots in the adjacent slat to link the slats together to form a continuous belt. Rollers 408 mounted on pins 409 to the slats are provided which support the belt on the conveyor and enable the belt to be dragged along by engagement of the rollers with indents in a drive wheel of the conveyor.

It will also be understood that the C-shaped caps of the third embodiment can be used on the leading or trailing or both leading and trailing edges of the slots in this fourth embodiment.

A still further embodiment of a conveyor 500 is illustrated in FIGS. 15 to 18 of the accompanying drawings. Here, a series of slats 510 forming a conveyor surface are connected to one or more elongate steel belts formed from a plurality of steel strips 520. The strips 520 are connected together end to end to form the belt by interconnection of upstanding tabs 521 on one end of each strip with slots 522 formed in the end of an adjacent strip. Two connected strips are shown in FIG. 14 of the accompanying drawings. Of course it would be possible to make the belt from one long strip which is connected end on end.

The slats 10 are the same as those shown in FIG. 1 of the drawing and include an undercut socket 530 in the lower side of the slat. The socket 530 in each slat 510 has a trapezoidal cross section with the space between the side walls of the socket where they meet the base of the socket 530 being wider than the gap between the openings of the socket so that the walls effectively taper away from each other to form an undercut.

Each strip 520 has a relatively narrow waist portion 523 at its center point (midway between its ends) where the width of the strip is narrower than the rest of the strip. This is achieved by cutting away two opposing side parts of the strip. To connect the slat to the strip a two part connector is provided. An exemplary connector 540 is shown in FIGS. 17(a) and 17(b) and an alternative is shown in FIG. 18.

Figure 18:
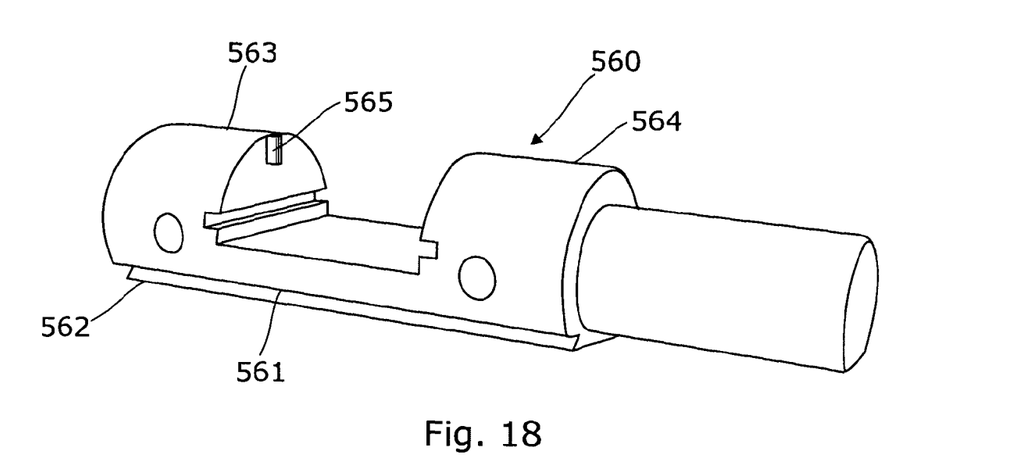
FIG. 18 is a view of an alternative design of connector part for use in the embodiment of FIG. 15.

The connector 540 comprises an upper body 560 as shown in FIG. 17(a) and in modified form in FIG. 18. The upper body 560 comprises a planar base part 561 and a tail 562 which projects from the center of the flat side of base part of the body. The tail 562 is trapezoidal and wider at its end furthest from the body than it is at its end nearest the body, and complements the cross section of the socket 530. As such the tail 562 tapers outwards away from the body. This tail can be slid into the slot 530 in the underside of the slat in the manner described for the first embodiment of the invention.

The upper body 560 has two side portions 563,564 which extend away from the base part 561 on the opposite side to the tail 562 and are spaced apart by a distance slightly greater than the width of the relatively narrow center portion of the metal strip 520, so that the strip can be located between the side portions resting on the upper face of the base part.

A second, lower body, part 550 of the connector 540 forming a trunion of semi-cylindrical cross section is provided which is a snap fit between the side portions. When snapped in position the second lower body part clamps the strip in place between the side portions of the lower body part 560. To achieve the snap fit there are small protrusions 565 on each side portion that are accommodated within corresponding cut-outs 551 in the sides of the lower body portion of the connector. To release or engage the two parts of the connector a force has to be applied that is sufficient to deform the protrusions and/or bend the side portions outwards from one another slightly. Small outwardly extending ridges 552 along the sides of the second body part are received in corresponding slots 566 in the side walls of the first body part to provide additional security to the engagement of the connector parts.

Figures 15, 16:
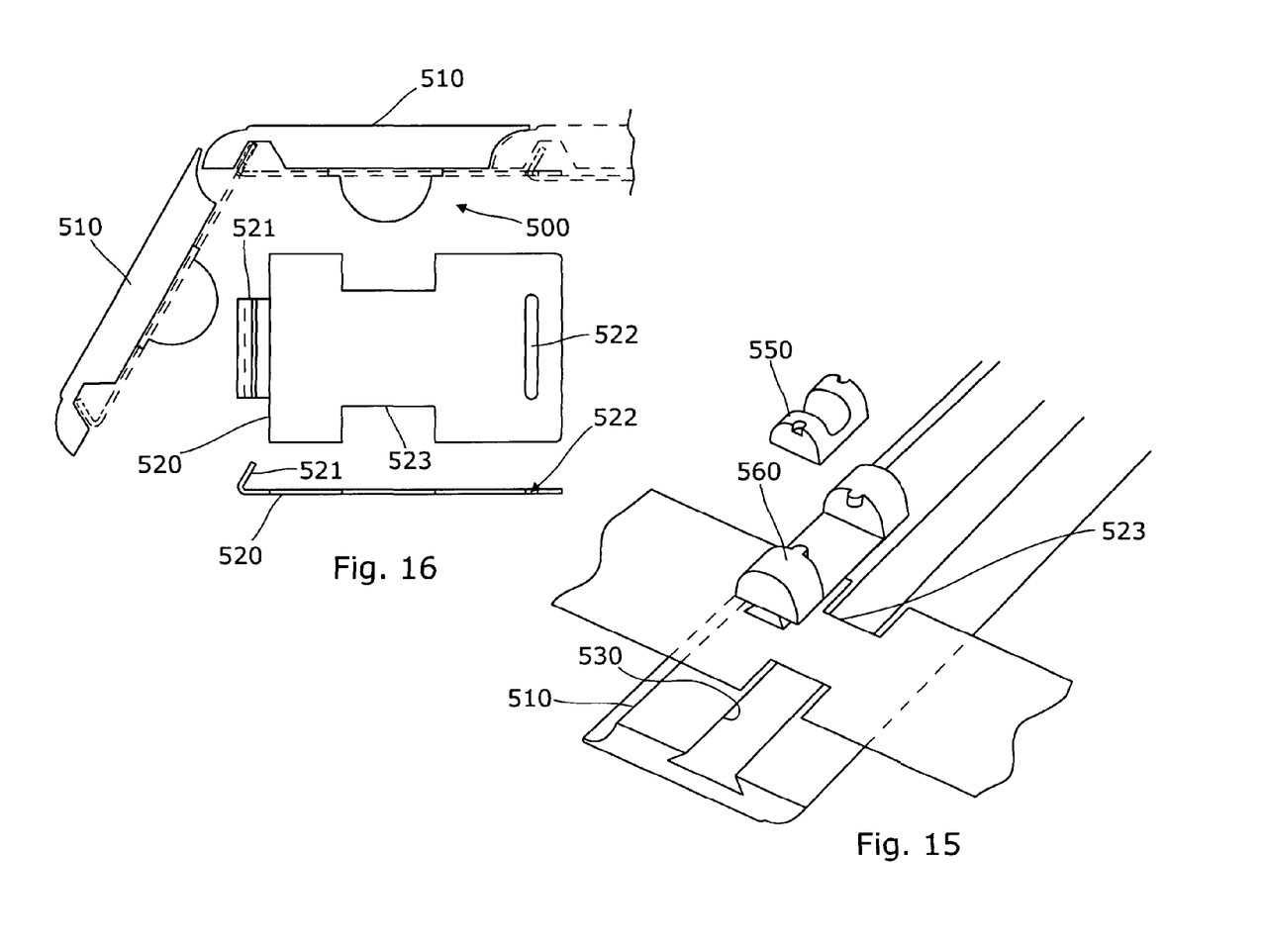
FIG. 15 is an exploded view of parts of a still further alternative embodiment of a conveyor belt of the present invention.
FIG. 16 is a view of the relative location of the parts of the conveyor belt of FIG. 15 when connected.
Figure 17:
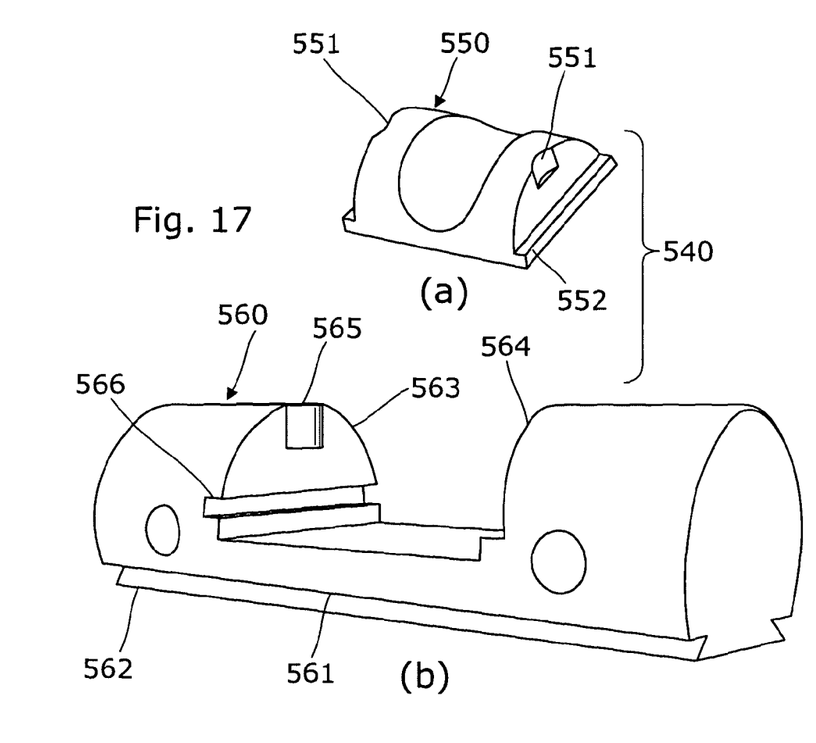

FIG. 15 shows the two body parts of the connector 540, a slat 510 and a strip 520 prior to assembly. Note that the two body parts are shown above the slat although when assembled one will be located on each side of the slat.

Figure 19:
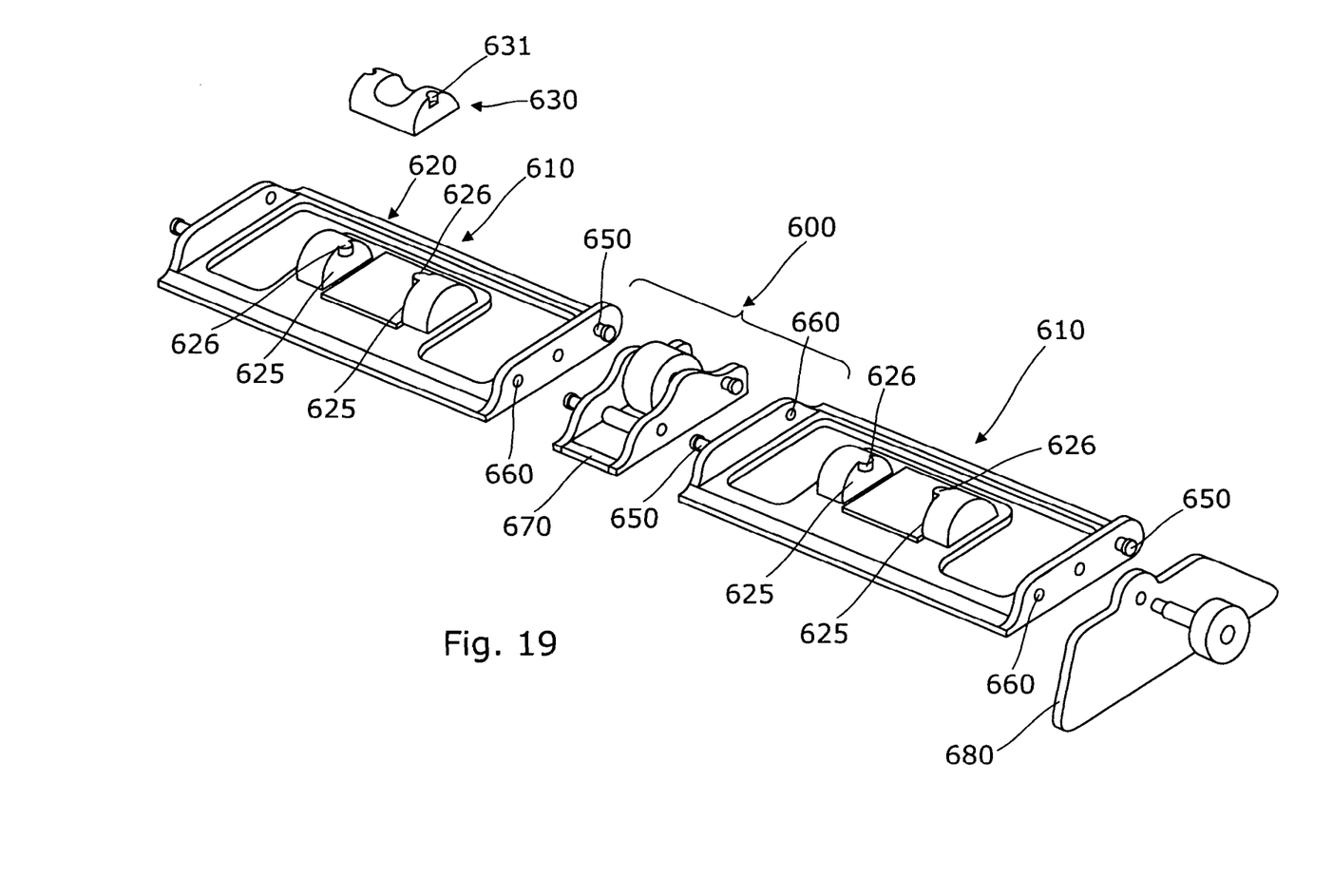
FIG. 19 is an exploded view of a still further embodiment of a conveyor belt in accordance with an aspect of the invention.

A still further embodiment 600 is illustrated in FIG. 19 of the drawings. This is similar to that of the embodiment of FIG. 15, and differs in several ways although it stills at its heart comprises slats 610, strips (not shown but identical to those shown in FIG. 15) forming a belt and a two part connector 620,630 that is secured to the slat and snap fits around the strip.

In this embodiment, an first part 620 of the connector body, with the spaced apart side walls 625, is integrally formed with the slat part 610 rather than being attached to it by a dovetail joint. This can readily be achieved by injection molding the slat part and connector. The steel strip is retained by the connector in the same manner as that described in connection with FIG. 15.

The connector comprises a first body part 620 defining side walls 625 which are spaced apart by a distance slightly greater than the narrow section of the steel strips that form the belt, but narrower than the rest of the strip. A second body part 630 snap fits between the side walls to secure the strip in place. As with the embodiment of FIG. 15 the snap fit is assured by protrusions 626 on the side walls engaging cutouts 631 in the ends of the second connector body part.

The molded slat part 610 has a preset length, say 8 inches, and has an arrangement of studs 650 and holes 660 on its ends which enable multiple slats 610 to be connected together by a snap fit in an end to end arrangement to make longer composite slats, each one with at least one connector. As shown in FIG. 19 a composite slot is formed from two identical slat parts 610. This differs from the embodiment of FIG. 15 where it is most likely that a single one piece slat will be provided, which is then cut down to length as required before connectors and any infill pieces between connectors are added.

Also as shown in FIG. 19, an optional center roller 670 can be provided that joins together adjacent slats, and end plates 680 can also be connected to the free ends of the last slat in each composite slat.

The invention claimed is:

1. A belt for a conveyor comprising at least one, but preferably a plurality of elongate strips, and at least one slat which forms a part of a conveyor surface upon which a load to be transported can be located, in which the slat is secured to the strip by a connector through a sliding dovetail joint, the connector comprising the tail part of the joint and the underside of the slat being provided with a groove defining a socket part of the sliding dovetail joint, wherein the socket extends across the underside of the slat in a direction that is not parallel to the long axis of the belt and is open ended at least at one side of the slat to enable the tail to be slid into the slat from that open end during assembly.

2. A belt according to claim 1 in which the conveyor includes two spaced side walls between which the slats are located, the walls limiting the amount of side to side movement of the slat relative to the belt.

3. A belt according to claim 1 in which the connector comprises a body which is located on the opposite side of the belt to the slat such that the belt is located between the body and the underside of the slat.

4. A belt according to claim 3 in which the body comprises a trunion or guide surface.

5. A belt according to claim 3 in which the at least one or each of the plurality of elongate strips individually include a hole along its centre line and the connector extends through the slot such that the tail of the connector is on one side of the strip and the body is on the other.

6. A belt according to claim 5 in which the hole has a first part which is wide enough to allow the tail of the connector to be passed through the hole in the strip during assembly before being moved along the strip to engage a second part of the slot which is narrower than the first and through which the tail part cannot be withdrawn.

7. A belt according to claim 6 in which the connector is fixed in position in the narrow second part of the slot by one or more tabs on the strip.

8. A belt according to claim 3 in which the connector comprises a unitary component, with the body and tail formed of a piece.

9. A belt according to claim 1 in which the connector is secured to the strip by one or more fasteners, such as pins, screws, bolts, rivets or other suitable fasteners and in which the body of the connector and the tail are separate components.

10. A belt according to claim 1 in which the connector comprises two releasable parts which when connected together in a position of use embrace a section of the strip such that the tail of the connector is on one side of the strip and the body, typically a trunion, is on the other side of the strip.

11. A belt according to claim 10 in which the connector comprises a first body portion including the tail which is located on one side of the strip and a second body portion that is located on the other side of the strip, one of the body portions including side portions that project from one side of the strip to the other and the other of the body portions being connected to the side portions to embrace the strip.

12. A belt according to claim 1 in which the conveyor includes two sets of strips arranged in parallel locations, each one being secured to the slat, or many slats, at spaced locations on the slat through one of the connectors.

13. A belt according to claim 1 in which one or more infill pieces are located in the parts of the elongate socket on the slat that are not occupied by a tail of a connector and are shaped to substantially prevent material entering the socket and becoming trapped.

14. A belt according to claim 1 wherein the at least one elongate strip is an endless belt.

15. The belt of claim 1 wherein the tail part of the joint is wedge-shaped and substantially fills a cross-section of the socket part of the joint and a thickest part of the tail part is furthest from an open edge of the socket part.

16. A belt for a conveyor comprising at least one, but preferably a plurality of elongate strips, and at least one slat which forms a part of a conveyor surface upon which a load to be transported can be located, in which the slat is secured to the strip by a connector through a sliding dovetail joint, the connector comprising the tail part of the joint and the underside of the slat being provided with a groove defining a socket part of the sliding dovetail joint, wherein the strip includes a relatively narrow waist section, and the connector embraces this narrow waist section by locating the section in an opening in the body which is at least as wide as the narrow section but not as wide as the un-narrowed part of the strip.

* * * * *